Jan. 2, 1968        G. E. WALKER        3,361,216
DAMPING DEVICES
Filed April 19, 1965        3 Sheets-Sheet 1
FIG. 1
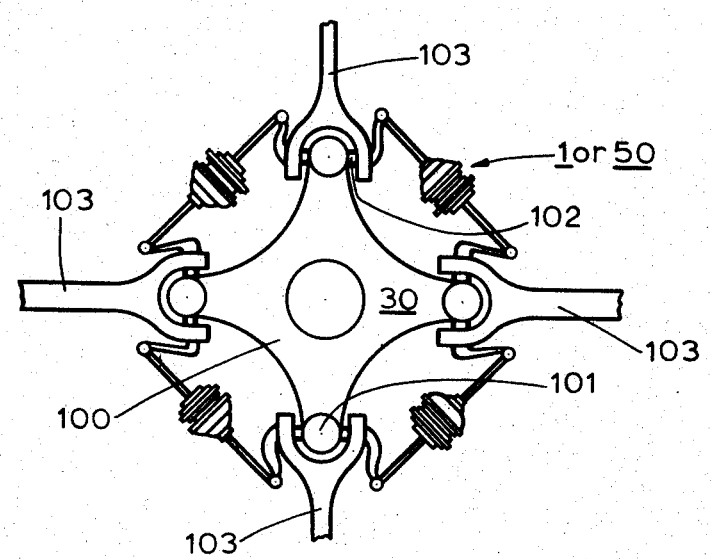
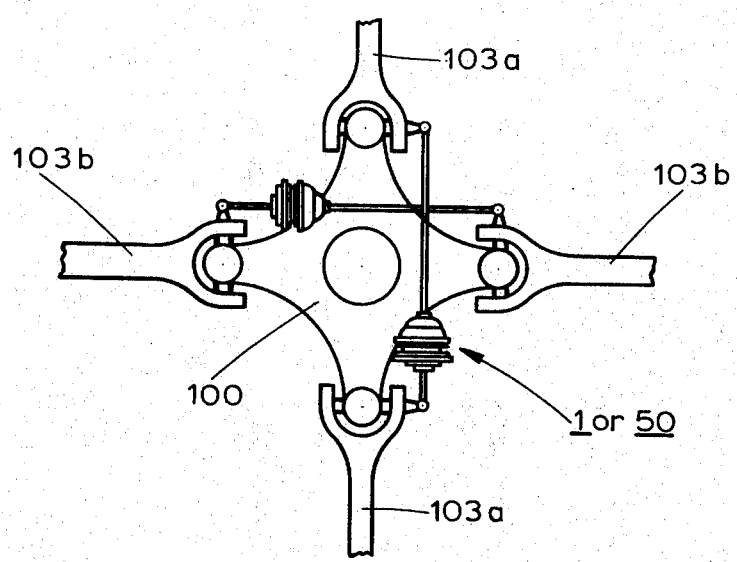
FIG. 2

Jan. 2, 1968  G. E. WALKER  3,361,216
DAMPING DEVICES

Filed April 19, 1965  3 Sheets-Sheet 2

Jan. 2, 1968  G. E. WALKER  3,361,216
DAMPING DEVICES

Filed April 19, 1965  3 Sheets-Sheet 3

United States Patent Office 3,361,216
Patented Jan. 2, 1968

3,361,216
DAMPING DEVICES
George E. Walker, Yeovil, Somerset, England, assignor to Westland Aircraft Limited, Yeovil, Somerset, England
Filed Apr. 19, 1965, Ser. No. 448,991
Claims priority, application Great Britain, Apr. 24, 1964, 17,002/64
2 Claims. (Cl. 170—160.55)

ABSTRACT OF THE DISCLOSURE

A hydraulic damping device to be interconnected between adjacent or opposing rotor blades of a rotary wing aircraft is provided to effect damping about the drag hinges, the damper comprising two fluid chambers interconnected by means of restricted ports, two walls of the chambers being formed by rolling diaphragms which are enclosed by relatively movable rigid walls, so that, in operation, the diaphragms are squeezed between the rigid walls and fluid is forced from one chamber to another to effect damping.

---

This invention relates to dampers for rotor blade assemblies of aircraft and more particularly, although not essentially, to those of helicopter rotor systems.

Two types of dampers are known and have been in general use on helicopters, namely friction and hydraulic. Friction dampers are normally associated with the drag hinges of individual rotor blades, each damper comprising a series of friction plates, loaded in a manner such as to discourage movement of the blade about the hinge. However, such dampers, particularly when starting the rotation of a rotor from rest, with the blades in slight asymmetric disposition, suffer a disadvantage in that resonant conditions may be obtained before sufficient centrifugal force exists to overcome the frictional damping effect. In order to maintain symmetry of the blade arrangement, it is well known to additionally provide compression members between the blades.

Hydraulic dampers, as with friction dampers, are used to discourage movement about the drag hinges; however, they allow asymmetrically deflected blades to attain symmetry, when starting to rotate, at lower rotational speeds and consequent centrifugal force than is required for friction dampers. This obviates the need for the installation of compression members between blades. However, whilst hydraulic dampers provide distinct advantages over friction dampers in respect of starting the rotation of a rotor blade system, as aforementioned, they do suffer a disadvantage in as much as, being fluid filled, they invariably tend to leak slightly at their seals and glands, and this necessitates provision of a reservoir which requires periodic maintenance to ensure a satisfactory fluid level.

It will be further understood that the total movement of a blade about its drag hinge may be, for example, about 25° in the plane of rotation, the largest movement being caused by variation in the rotor torque which will impart equal instantaneous displacements to each blade. Smaller movements are caused by the flying characteristics of the helicopter, and will vary on each individual blade. Such movements will be within the range of ±1° about the blade radial position. Hence, the greatest amount any two blades will be out of phase with respect to each other will be 2° in the plane of rotation.

Most of the rotor systems in present use provide either friction or hydraulic damping over the whole movement of the blade about the drag hinge. It is possible, however, to design the rotor hub so that only the small blade movements out of symmetry require damping. For example, if in a rotor hub, the drag hinge is positioned coincident or inboard of the flap hinge with the drag hinge lugs attached to the rotor hub, then it is possible to arrange blade to blade interconnecting struts incorporating short stroke hydraulic dampers. These dampers accommodate the out of symmetry requirements of the blades only, the symmetrical blade displacements due to torque having no effect on the blade to blade strut length.

It is an object of the invention to provide a short stroke damper requiring minimal maintenance whilst in service.

The present invention consists in a damper for rotor blade assemblies of aircraft, and comprises a liquid containing unit divided into first and second chambers by a rigid member, restricted passages communicating between the chambers, each chamber having at least one of its walls flexible or part flexible, first connection means adapted to be attached to the rigid member, and second connection means adapted to be attached to the walls in a manner such as to allow relative movement between the two connection means which together provide means of connection of the damper to the assembly to be damped.

The present invention will now be described by way of example only, with reference to the accompanying drawings, in which:

FIGURES 1 and 2 show diagrammatic plan views of two rotor systems incorporating short stroke diaphragm dampers.

Referring to FIGURE 1, the rotor hub assembly includes a hub 100 providing coincident drag and flapping hinges 101 and 102 respectively, and incorporates diaphragm dampers 1 or 50 disposed between adjacent blades 103, whilst FIGURE 2 discloses a similar hub assembly with an alternative dispositioning of the diaphragm dampers 1 or 50, which are so arranged as to provide damping of pairs of blades 103A, 103B, which are in diametric relationship about the hub 100.

Figure 3:
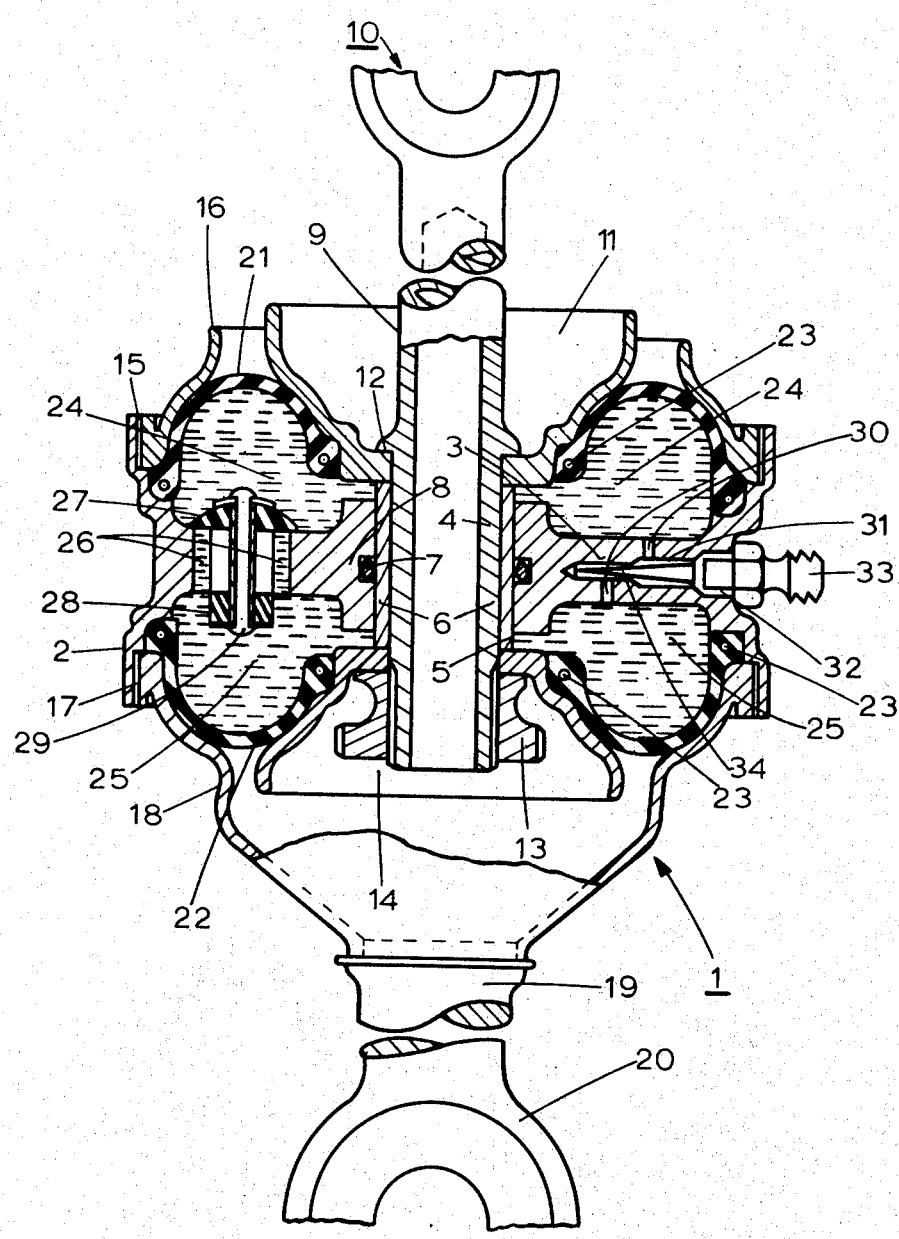
FIGURE 3 is a sectional view of one embodiment of a diaphragm damper.

One embodiment of the invention as shown in FIGURE 3 and generally indicated at 1 comprises a cylindrical body 2 which provides a centrally disposed annular web 3 extending into its bore. The inner diameter of the annular web 3 provides a short bush 4, the bore 5 of which is parallel with the longitudinal axis of the cylindrical body 2 and provides a sliding fit on a sleeve 6, which is longer than the bush 5. Leakage between the sliding surfaces of the bore 5 and the sleeve 6 is prevented by a sealing ring 7 housed in an annular groove 8 within the bore 5. The sleeve 6 is disposed coaxially about the shank 9 of a first connection member, generally indicated at 10, and is adapted to trap a rigid first inner wall member 11 against a shoulder 12 on the shank 9 by way of a nut 13 threaded thereon and thrusting against a rigid second inner wall member 14 interposed between the nut 13 and the sleeve 6. The first and second inner wall members 11, 14 respectively, are similar, being substantially bell-shaped, and are assembled on the shank 9 such that their convex surfaces are presented one to the other. The cylindrical body 2 provides, at one end, internal screw-threads 15, which locate and securely retain a rigid first outer wall member 16 which is substantially bell-shaped. The opposite end of the cylindrical body 2 provides further internal screw threads 17, and these provide location and retention of a second outer wall member 18, which, in part, is of similar shape to the first outer wall member 16, but is extended to reduce in diameter to that which is conveniently adapted to be attached to the shank 19 of a second connection member 20. The first and second outer wall members 16, 18 respectively, are assembled so as to present their concave surfaces one to the other and, furthermore, are dispositioned so as to be radially spaced about the first and second inner wall members 11, 14 respectively. The first outer wall member 16 is positioned about the first inner wall member 11 and the second outer wall member 18 is positioned about the second inner wall member 14 in a manner such as to provide two annular, substantially trough-like support means for first and second flexible wall elements 21 and 22 respectively. The elements 21, 22 are formed from nylon reinforced moulded rubber, and are of annular trough-like form, having reinforcing cord 23, to which the nylon reinforcing material is anchored, moulded into rims formed at the edges of each element, 21, 22. When assembled, the elements 21, 22 are securely nested into, respectively, the troughlike supports provided by the dispositional relationship of the first inner wall member 11 with the first outer wall member 16 and by the second inner wall member 14 with the second outer wall member 18.

The assembly of the parts, as so far described, provides the damper with a first and second annular chamber 24, 25, between which a separating wall is provided by the web 3 of the cylindrical body 2. The web 3 has four damper ports (of which two, 26, are shown, and two are not shown) disposed in a manner such as to be equally spaced along a common pitch-circle and providing communication between the first and second chambers 24, 25. The ports 26 are associated in diametric pairs with first and second flexible obturating members 27, 28, which are disposed one on each side of the web 3 and retained by means of a rivet, washer plate and compression tube, in the well known manner, generally indicated at 29. Two further ports 30 in web 3 provide communication between the first and second chambers 24, 25, by connecting with a blind-ended hole 31 extending radially into the web 3 from the outside of the cylindrical body 2. The entry of the blind-ended hole 31 is provided with a threaded portion 32, into which is screwed a valved filler connection 33, which is adapted to provide a tapered needle valve 34.

Figure 4:
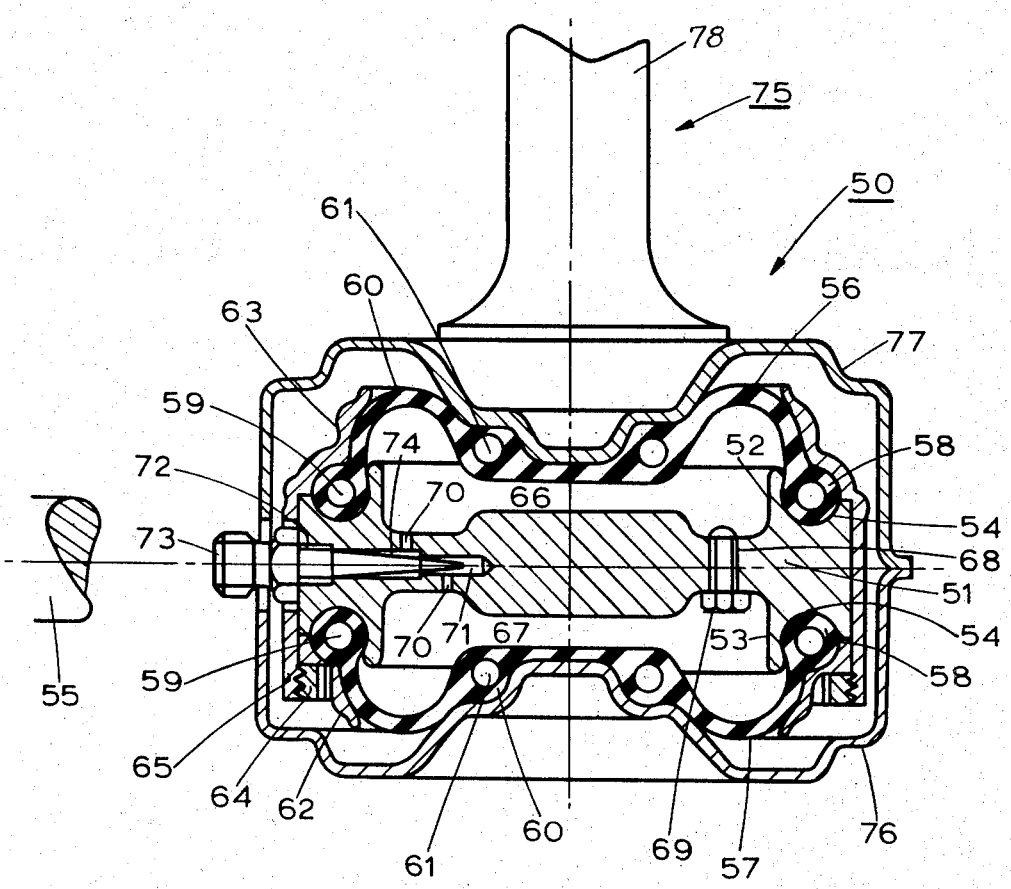
FIGURE 4 is a sectional view of an alternative embodiment of a diaphragm damper.

In a second embodiment of the invention, generally indicated at 50 in FIGURE 4, the damper comprises a circular web member 51 from which, and towards the perimeter thereof on each face, extends a circular wall, referred to as first and second walls, 52, 53 respectively. The outer extent of the web member 51 between its perimeter and the walls 52, 53 provides, on both faces, an annular groove 54 into which blends the base of the respective first or second wall 52, 53. Screwed into and extending diametrically from the perimetric edge of the web member 51 are two trunnion members (not shown) which co-operate with a yoke attachment of a first connection member 55.

Located, respectively, by the first wall 52 and second wall 53 are first and second nylon reinforced rubber diaphragms 56, 57, which are securely retained against the web member 51, in a leakproof manner, by way of a collar and sleeve arrangement (described hereinafter). Each of the diaphragms 56, 57 is formed in a manner such as to be generally cup-shaped and has, moulded into a perimetric rim 58, a reinforcing cord 59 to which the reinforcing material is anchored. The perimetric rim 58 of each daphragm 56, 57, is so formed as to fit snugly into the annular grooves 54 of the web member 51. On each of the first and second diaphragms 56, 57, is an annular ridge 60 of approximately one third of the maximum diameter of the diaphragms, and moulded into the ridge is a further reinforcing cord 61.

The collar and sleeve arrangement which retains the diaphragms 56, 57, to the web member 51, comprises a collar 62, a sleeve 63 and a locking ring 64. The collar 62 is a rigid annular ring of substantially Z cross-section, and is formed so as to fit closely over the first diaphragm 56 in a manner such as to force the perimetric rim 58 thereof to bed into one of the annular grooves 54 in the web member 51, upon application of axially applied pressure. The sleeve 63 is a rigid tube, being at one end, of substantially similar Z cross-section to that of the collar 62, but with the annular wall of greatest diameter extended and provided at its mouth with internal screw-threads 65. The greatest diameter of the collar 62 is the same dimension as the perimetric diameter of the web member 51, both of which are adapted to permit the extended annular wall of sleeve 63 to be slid over them until it closely fits over the second diaphragm 57 in a manner such as to force the perimetric rim 58 thereof to bed into the other annular groove 54 in the web member 51, upon axially applied pressure. Such axial pressure is applied to the diaphragms 56, 57, by way of the locking ring 64, which is adapted to be screwed into the threads 65 of the extended annular wall of the sleeve 63 to bear upon the radial portion of the collar 62 and urge the collar 62 and the sleeve 63 axially towards one another, thereby squeezing the perimetric rims 58 of the diaphragms 56, 57, into leakproof contact with the annular grooves 54 of the web member 51. The leakproof assembly of the diaphragms 56, 57, with the web member 51, provides similar first and second chambers 66, 67, which, by way of means now to be described, are in communication with each other.

Two ports 68 (one only shown) pass through the web member 51 to connect the chambers 66, 67. Each port 68 is provided with a pressure relief valve 69 (of any known and suitable constructon) in a manner such that one port and valve arrangement permits communication only from the first chamber 66 to the second chamber 67 whilst the other port and valve arrangement provides communication only in the reverse direction. Two further ports 70 in the web member 51 provide communication between the two chambers 66, 67, by connecting with a blind-ended hole 71 extending radially into the web member 51 from the perimetric edge thereof. The entry of the blind-ended hole 71 is provided with a threaded portion 72, into which is screwed a valved filler connection 73, which is adapted to provide a tapered needle valve 74.

A second connection member, generally indicated at 75, is provided, and is attached to the diaphragms and and web member assembly, so that the diaphragms 56, 57 are locally supported in fixed space relationship, one to the other, by a pressed metal cage which comprises part of the connecting member 75. The cage consists of substantially two similar parts 76, 77, of which one part 77 additionally provides an attachment arm 78. The parts 76, 77, of the cage are each substantially cup-shaped, and when secured together provide a cylinder within which the assembly of rigid members of the chambers 66, 67, are constrained to move as a piston. The local support of the diaphragms 56, 57, is provided by a hub disposed in the base of each cup-like part 76, 77, and so formed as to locate the annular ridge 60 of the diaphragms 56, 57.

The cylindrical body of the cage provided by the two parts 76, 77, when secured together, is adapted to provide two diametrically disposed axial slots, through which the two trunnion members (not shown) project in order to be pivotally attached to the yoke member of the first connection member 55, also a further axial slot is appropriately provided to permit the valved filler connection 73, to project.

For the two embodiments, generally indicated at 1 or 50, to be operational, the respective chambers 24, 25 and 66, 67, are filled to a pressure of say 200 p.s.i. with a fluid which is an anti-freeze solution of constant viscosity.

In operation of the invention, for example, when a damper 1 is interconnected between two adjacent blades 103 (FIGURE 1) or between two diametrically disposed blades 103A, 103B (FIGURE 2), compressive or extensive loads imparted to the damper 1 urge the cylindrical body 2 together with the annular web 3, first and second outer wall members 16, 18 and second connection member 20, to move axially relative to the first inner wall member 11, and second inner wall member 14 on the sleeve 6 located on the shank 9 of the first connection member 10. Small interchanges of fluid displacement between the annular chambers 24, 25, are accommodated by way of the two ports 30, of which adjustable restriction is appropriately selected by way of the needle valve 34 provided by the filler connection 33, whereas larger interchanges of fluid displacement are by way of damper ports 26 being regulated by either of the two obturating members 27, 28, according to the direction of flow.

In operation, a damper 50 (FIGURE 4) behaves in a similar manner to that of damper 1, when subjected to compressive or extensive forces. The web member 51, to which is attached the first connection member 55 by way of the yoke and trunnion arrangement (not shown), moves axially within, and relative to, the cage assembly of the second connection member 75. Small interchanges of fluid displacement between the chambers 66, 67, is by way of the two ports 70, and the blind-ended hole 71 housing the needle valve 74 of the filler connection 73, whereas larger interchanges of fluid displacement are by way of the damper ports 68 being regulated by either of the pressure relief valves 69 according to the direction of flow.

In the dampers 1 and 50 as illustrated in FIGURES 3 and 4, it will be noted that the annular trough-like supports of the diaphragms are so formed that during displacement of fluid from one chamber to the other, the relative diaphragms roll along the surfaces of the appropriate wall members in a manner such that the effective diameters of the two diaphragms vary inversely. The effective area of the diaphragm of the chamber into which the displaced fluid flows is progressively decreased whilst the effective area of the associated diaphragm of the discharging chamber is progressively increased, to thereby provide a non-linear damping characteristic.

I claim as my invention:

1. A rotor assembly comprising a hub, a plurality of blades attached to said hub and relatively movable with respect thereto, and damper means connected between at least two blades, said damper means comprising a liquid containing unit divided into first and second chambers by a rigid member, restricted passages communicating between the chambers, adjustable valve means in at least one of said passages each of the chambers having at least one of its walls at least partially flexible so that the effective diameters of the chambers are variable, first connection means attached to the rigid member and to one of said blades and second connection means attached to the walls and to another blade in such a manner as to allow relative movement between the two connection means, such arrangement providing means of connection of the damper to the assembly to be damped, and wherein the flexible parts of the walls of each of the first and second chambers comprise rolling diaphragm means for inversely varying the relative effective diameters of the respective chambers during operation of the damper.

2. A rotor assembly as claimed in claim 1 wherein the adjustable valve means comprises needle means which allows for smaller interchanges of fluid and another of said passages contains an obturator member which allows for the interchange of larger amounts of fluid.

References Cited

UNITED STATES PATENTS

| | | | |
|---|---|---|---|
| 2,457,749 | 12/1948 | Thiry | 188—87 X |
| 2,604,953 | 7/1952 | Campbell | 170—160.55 |
| 2,636,726 | 4/1953 | Mercier | 170—188 X |
| 2,774,553 | 12/1956 | Jensen | 170—160.55 |
| 2,936,860 | 5/1960 | Peras | 188—94 |
| 3,052,328 | 9/1962 | Brueckner | 188—88 X |
| 3,076,643 | 2/1963 | Bittel | 188—88X |
| 3,107,752 | 10/1963 | McLean | 188—87 |

FOREIGN PATENTS

| | | |
|---|---|---|
| 1,066,276 | 4/1957 | Germany. |
| 787,848 | 12/1957 | Great Britain. |

EVERETTE A. POWELL, JR., *Primary Examiner.*

MARTIN P. SCHWADRON, *Examiner.*